United States Patent
Naito et al.

(10) Patent No.: US 11,588,164 B2
(45) Date of Patent: Feb. 21, 2023

(54) FUEL CELL VEHICLE

(71) Applicant: HONDA MOTOR CO., LTD., Tokyo (JP)

(72) Inventors: Hideharu Naito, Wako (JP); Kosuke Nishiyama, Wako (JP); Yasunori Ichikizaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 426 days.

(21) Appl. No.: 16/740,539

(22) Filed: Jan. 13, 2020

(65) Prior Publication Data

US 2020/0235411 A1 Jul. 23, 2020

(30) Foreign Application Priority Data

Jan. 17, 2019 (JP) .............................. JP2019-006057

(51) Int. Cl.
| | | |
|---|---|---|
| *H01M 8/04858* | (2016.01) | |
| *H01M 8/2475* | (2016.01) | |
| *B60L 50/71* | (2019.01) | |
| *B60L 58/30* | (2019.01) | |
| *H01M 8/04537* | (2016.01) | |

(52) U.S. Cl.
CPC .......... *H01M 8/0488* (2013.01); *B60L 50/71* (2019.02); *B60L 58/30* (2019.02); *H01M 8/04559* (2013.01); *H01M 8/2475* (2013.01); *H01M 2250/20* (2013.01)

(58) Field of Classification Search
None
See application file for complete search history.

(56) References Cited

U.S. PATENT DOCUMENTS

| | | |
|---|---|---|
| 10,897,054 B2 | 1/2021 | Tokunaga |
| 10,953,755 B2 | 3/2021 | Imanishi |
| 2017/0113531 A1 | 4/2017 | Imamura et al. |

FOREIGN PATENT DOCUMENTS

| | | | |
|---|---|---|---|
| JP | 2017-77821 | * | 4/2017 |
| JP | 2017-077821 | | 4/2017 |
| JP | 2018-152163 | * | 9/2018 |
| JP | 2018-163861 | * | 10/2018 |

OTHER PUBLICATIONS

JP2017-77821 translation obtained Jun. 21, 2022 via Google Patents (Year: 2017).*
JP2018-152163 translation obtained Jun. 21, 2022 via Google Patents (Year: 2018).*
JP2018-163861 translation obtained Jun. 21, 2022 via Google Patents (Year: 2018).*
Japanese Office Action for Japanese Patent Application No. 2019-006057 dated May 31, 2022.

* cited by examiner

*Primary Examiner* — Sarah A. Slifka
(74) *Attorney, Agent, or Firm* — Amin, Turocy & Watson, LLP (57) ABSTRACT

A fuel cell stack formed by stacking a plurality of power generation cells together in a vehicle width direction and a voltage control unit including a voltage controller and a control case are mounted in a front box of a fuel cell vehicle. The control case is joined to a stack case in a manner that the control case is provided adjacent to the stack case in a direction perpendicular to the stacking direction of the plurality of power generation cells. A cell voltage detection unit is provided between the fuel cell stack and a voltage control unit.

10 Claims, 8 Drawing Sheets

FUEL CELL VEHICLE

CROSS-REFERENCE TO RELATED APPLICATION

This application is based upon and claims the benefit of priority from Japanese Patent Application No. 2019-006057 filed on Jan. 17, 2019, the contents of which are incorporated herein by reference.

BACKGROUND OF THE INVENTION

Field of the Invention

The present invention relates to a fuel cell vehicle including stack case containing a fuel cell stack.

Description of the Related Art

For example, Japanese Laid-Open Patent Publication No. 2017-077821 discloses a fuel cell vehicle where a stack case containing a fuel cell stack is mounted in a front box formed on a vehicle front side of a dashboard.

SUMMARY OF THE INVENTION

In this regard, the fuel cell stack is provided with a cell voltage detection unit. The cell voltage detection unit is electrically connected to a plurality of power generation cell to detect cell voltage. In the case where the fuel cell stack and the cell voltage detection unit are disposed in the front box of the fuel cell vehicle, it is required to provide simple structure which makes it possible to prevent the damage of the cell voltage detection unit at the time of collision of the fuel cell vehicle.

The present invention has been made taking such a problem into account, and an object of the present invention is to provide a fuel cell vehicle having simple structure which makes it possible to prevent the damage of a cell voltage detection unit at the time of collision of the vehicle.

According to an aspect of the present invention, a fuel cell vehicle is provided. The fuel cell vehicle includes a stack case containing a fuel cell stack and a voltage control unit configured to control output voltage of the fuel cell stack, the stack case and the voltage control unit being mounted in a front box formed on a vehicle front side of a dashboard, wherein the fuel cell stack includes a plurality of power generation cells stacked in a vehicle width direction, the voltage control unit includes a voltage controller, and a control case containing the voltage controller, and wherein the control case is joined to the stack case in a manner that the control case is provided adjacent to the stack case in a direction perpendicular to a stacking direction of the plurality of power generation cells, and a cell voltage detection unit configured to detect cell voltage of the plurality of power generation cells is disposed between the fuel cell stack and the voltage control unit.

In the present invention, the cell voltage detection unit is disposed between the fuel cell stack and the voltage control unit. Therefore, at the time of collision of the fuel cell vehicle, it is possible to protect the cell voltage detection unit by the control case of the voltage control unit. Accordingly, with the simple structure, it is possible to prevent the damage of the cell voltage detection unit at the time of collision of the fuel cell vehicle.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Hereinafter, preferred embodiments of a fuel cell vehicle according to the present invention will be described in detail with reference to the accompanying drawings.

First Embodiment

Figure 1:
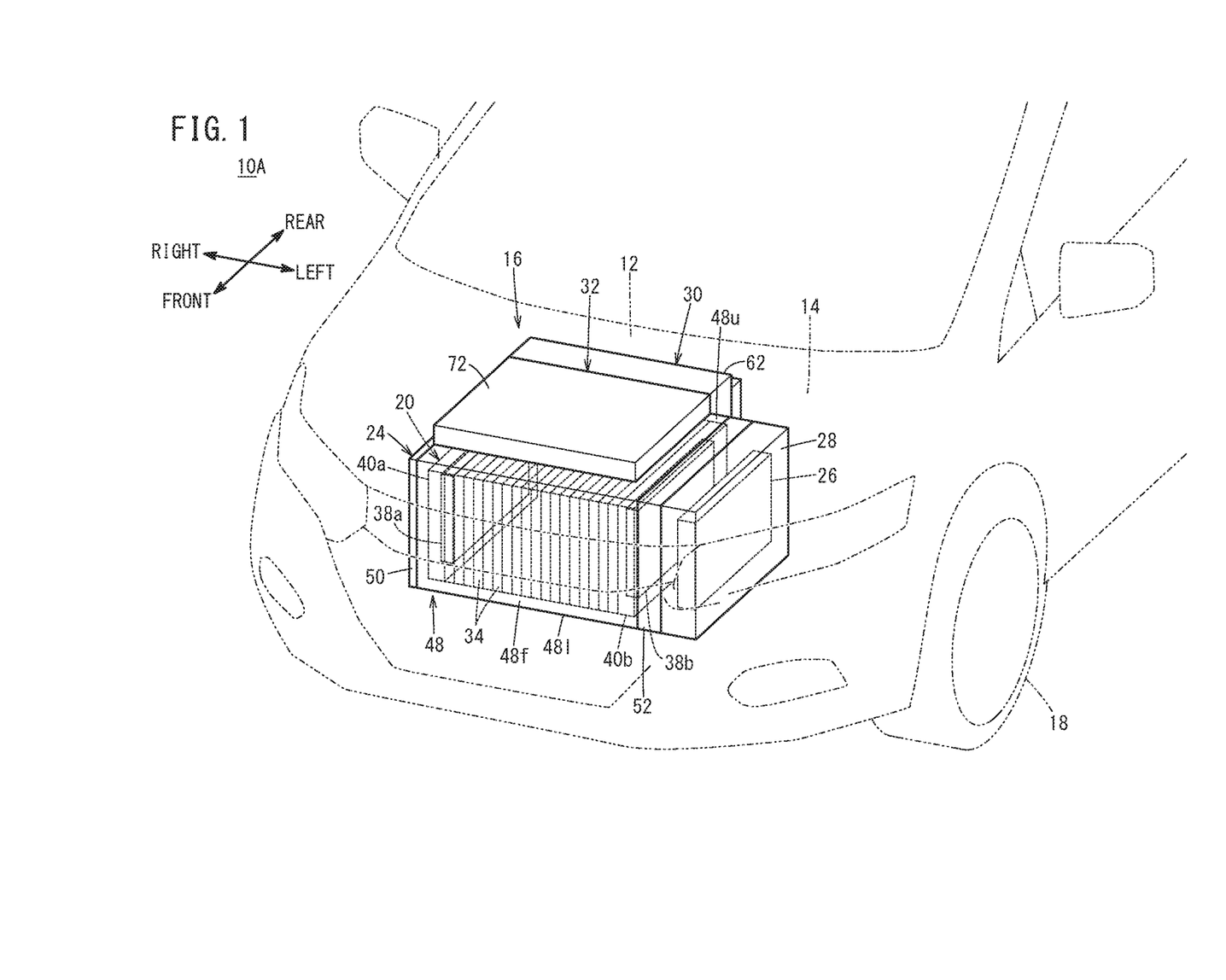
FIG. 1 is a perspective view schematically showing a fuel cell vehicle according to a first embodiment of the present invention, as viewed from the front side of the vehicle.
Figure 2:
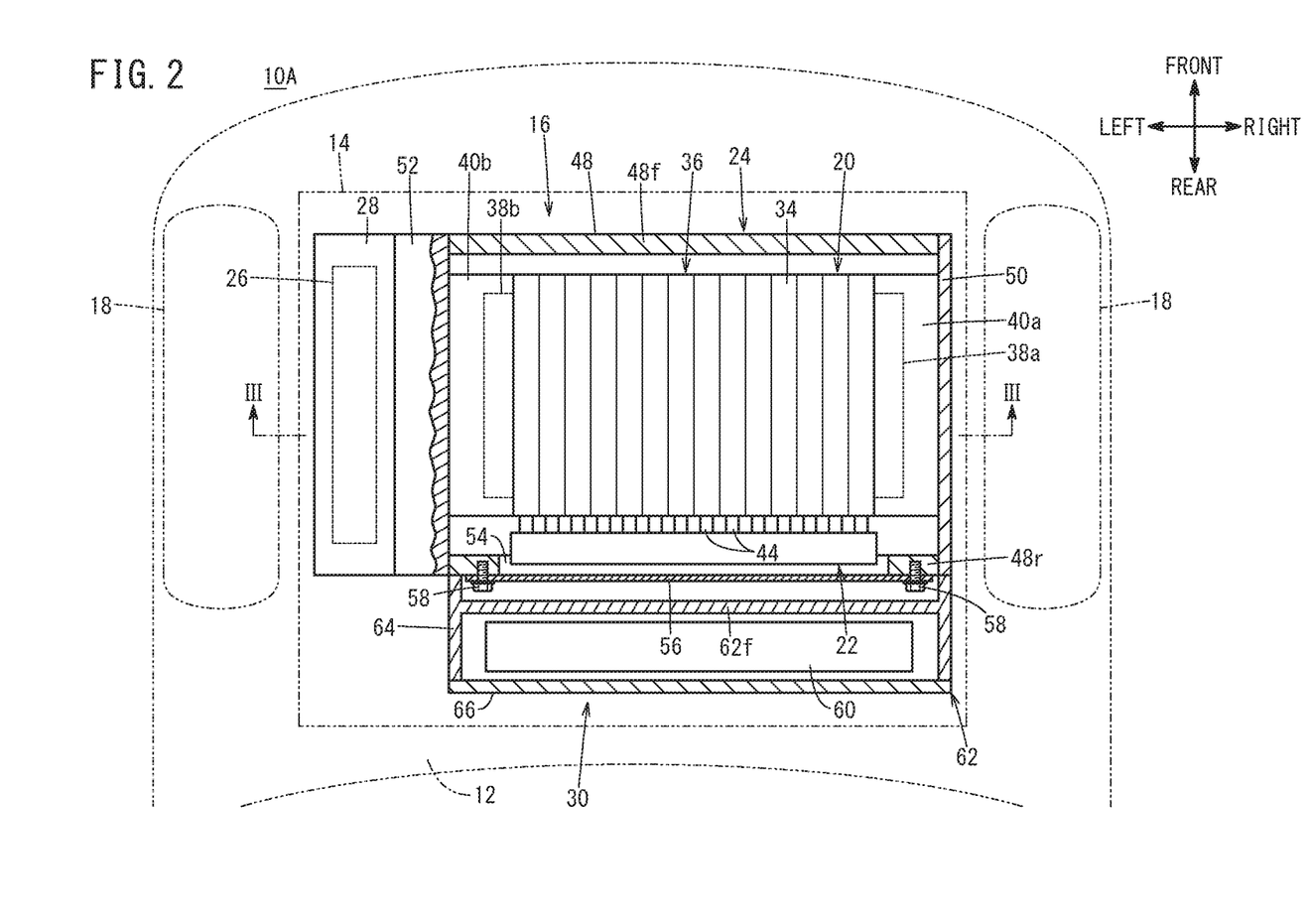
FIG. 2 is a lateral cross sectional view with partial omission, showing the fuel cell vehicle in FIG. 1.

As shown in FIG. 1, a fuel cell vehicle 10A according to a first embodiment of the present invention includes a fuel cell system 16 mounted in a front box 14 (motor room) formed on the vehicle front side of a dashboard 12. The front box 14 is positioned near front wheels 18. In FIGS. 1 and 2, the fuel cell system 16 includes a fuel cell stack 20, a cell voltage detection unit 22, a stack case 24, fuel cell auxiliary devices 26, an auxiliary device case 28, a voltage control unit 30 (VCU: Voltage Control Unit), and a contactor unit 32 (see FIG. 1).

As shown in FIG. 2, the fuel cell stack 20 includes a cell stack body 36 formed by stacking a plurality of power generation cells 34 together in a vehicle width direction (vehicle left/right direction). At one end of the cell stack body 36 in the stacking direction (end in a vehicle right direction), a first terminal plate 38a is provided. A first insulating plate 40a is provided outside the first terminal plate 38a. At the other end of the cell stack body 36 in the stacking direction (end of in a vehicle left direction), a second terminal plate 38b is provided. A second insulating plate 40b is provided outside the second terminal plate 38b.

Figure 3:
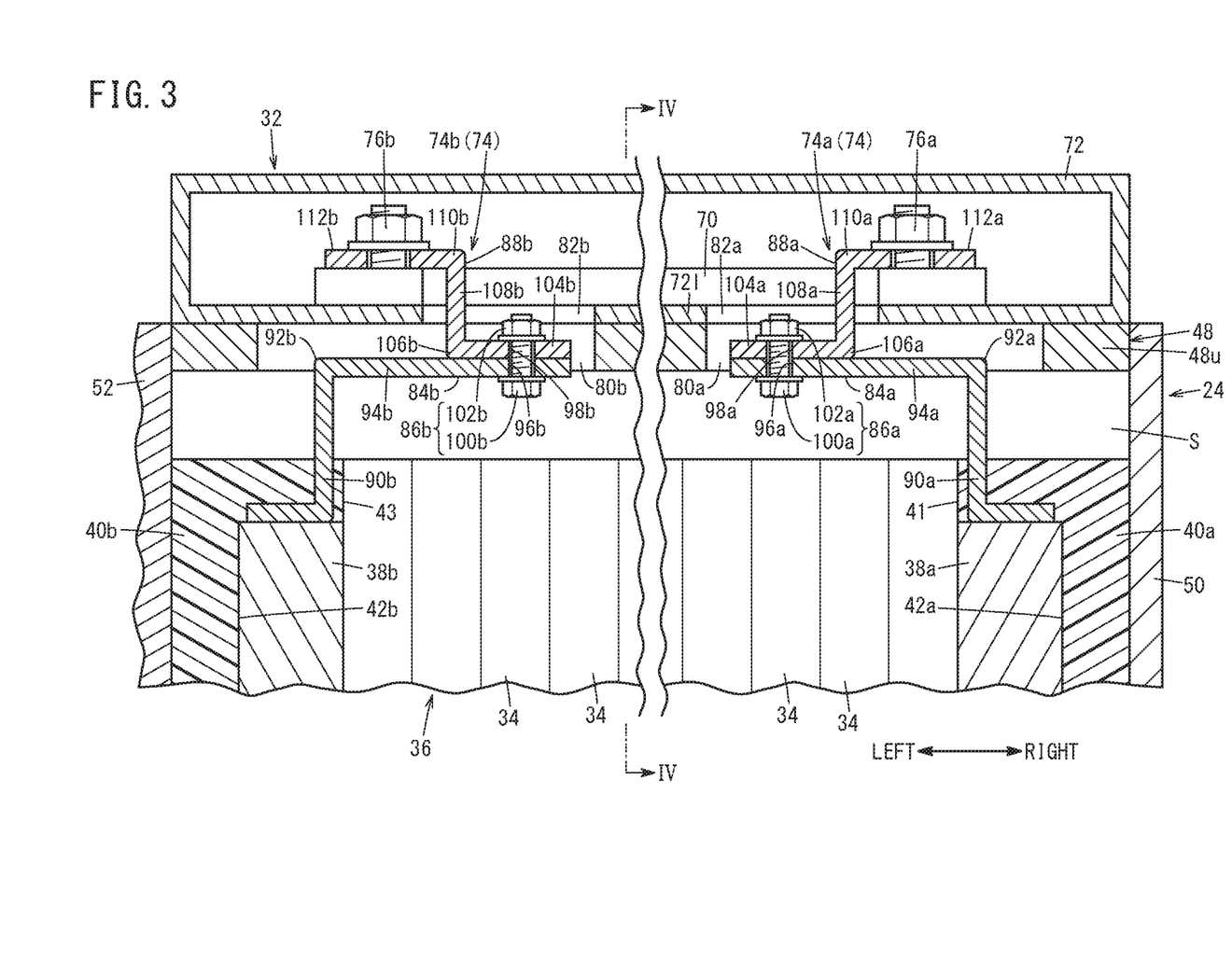
FIG. 3 is a vertical cross sectional view with partial omission, taken along a line III-III in FIG. 2.

In FIGS. 2 and 3, the first terminal plate 38a is disposed in a quadrangular recess 42a formed in a surface 41 of the first insulating plate 40a on a side where the cell stack body 36 is present. The second terminal plate 38b is disposed in a recess 42b formed in a surface 43 of the second insulating plate 40b on a side where the cell stack body 36 is present. A tightening load is applied to the fuel cell stack 20 by a coupling bar, etc. (not shown) in the stacking direction.

The power generation cell 34 performs power generation by electrochemical reactions of a fuel gas (e.g., hydrogen gas) and an oxygen-containing gas (e.g., air). Though not shown in detail, the power generation cell 34 includes a membrane electrode assembly and a pair of separators sandwiching the membrane electrode assembly from both sides. The membrane electrode assembly includes an electrolyte membrane, and a cathode and an anode provided on both sides of the electrolyte membrane. The electrolyte membrane is an ion exchange membrane.

As shown in FIG. 2, the cell voltage detection unit 22 includes a plurality of cell voltage terminals 44 connected electrically to the plurality of power generation cells 34, respectively, to detect cell voltage (voltage generated in the membrane electrode assembly). The cell voltage detection unit 22 is positioned on the vehicle rear side of the fuel cell stack 20 (cell stack body 36). An output signal from the cell voltage detection unit 22 is inputted to an FC ECU 46 (see FIG. 6). The cell voltage detection unit 22 may detect voltage of every predetermined number of power generation cells 34. Alternatively, the cell voltage detection unit 22 may detect voltage of a certain power generation cell 34 without detecting voltage of all of the power generation cells 34.

As shown in FIGS. 1 to 4, the stack case 24 includes a stack case body 48, a right side cover 50, and a left side cover 52. The stack case body 48 covers the fuel cell stack 20 from directions perpendicular to the vehicle width direction (a vehicle front/rear direction and an upper/lower direction). The stack case body 48 has a quadrangular cylinder shape, and includes a lower wall 48*l*, an upper wall 48*u*, a front wall 48*f*, and a rear wall 48*r*. Each of the lower wall 48*l*, the upper wall 48*u*, the front wall 48*f*, and the rear wall 48*r* is formed to have a rectangular shape, and extends in the vehicle width direction (in the stacking direction of the plurality of power generation cells 34).

Figure 4:
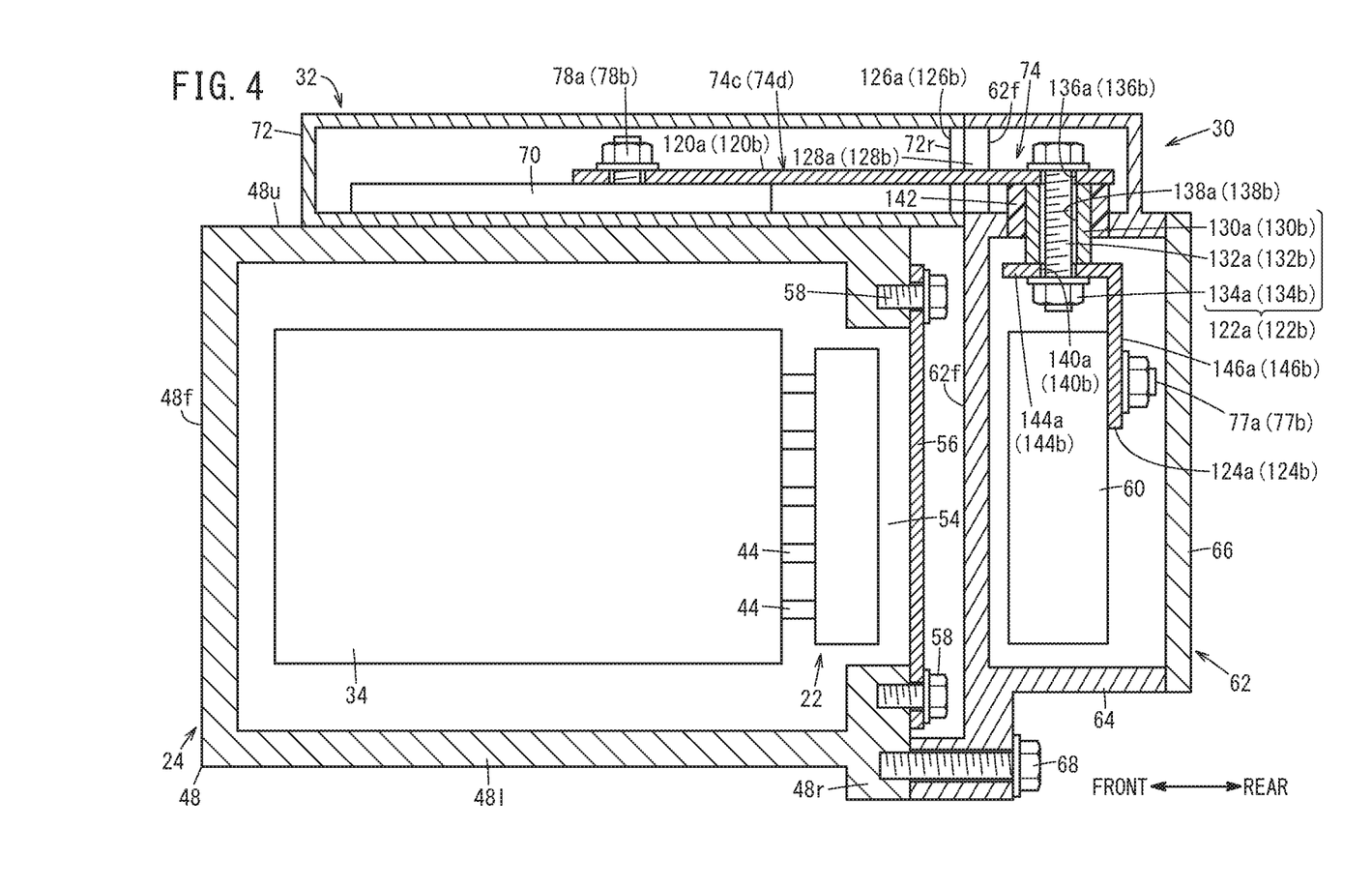
FIG. 4 is a vertical cross sectional view with partial omission, taken along a line IV-IV in FIG. 3.

In FIGS. 2 and 4, the rear wall 48*r* has a quadrangular opening 54. The cell voltage detection unit 22 is disposed in the opening 54. As described above, by forming the opening 54 in the rear wall 48*r*, it is possible to efficiently attach the cell voltage detection unit 22, and perform a maintenance operation.

A plate shaped cover member 56 is fixed to an outer surface of the rear wall 48*r* using tightening members 58 such as bolts in a manner that the cover member 56 covers the opening 54 from the outside. As shown in FIGS. 1 and 2, the right side cover 50 is coupled to the right end of the stack case body 48. The left side cover 52 is coupled to the left end of the stack case body 48.

The auxiliary device case 28 is a protection case for protecting the fuel cell auxiliary devices 26. The auxiliary device case 28 is coupled to the left side cover 52. The fuel cell auxiliary devices 26 include hydrogen system auxiliary devices (hydrogen gas supply devices) such as an injector, an ejector, a hydrogen pump, and valves, and air system auxiliary devices such as a heater, an air pump, and a back pressure valve.

In FIGS. 2 and 4, the voltage control unit 30 is disposed on the vehicle rear side of the stack case 24. Stated otherwise, the cell voltage detection unit 22 is disposed between the fuel cell stack 20 and the voltage control unit 30.

The voltage control unit 30 includes a voltage controller 60 for changing output voltage of the fuel cell stack 20 and a control case 62 containing the voltage controller 60. The voltage controller 60 is a DC/DC converter for elevating the voltage of electrical energy supplied from the fuel cell stack 20. The voltage control unit 30 controls the electrical current. Specifically, the voltage control unit 30 controls the secondary voltage (voltage on the output side) for controlling the electrical current.

The control case 62 has a box shape, and includes a control case body 64 opened to the vehicle rear side (opposite to the stack case 24) and a lid member 66 attached to the control case body 64 from the vehicle rear side. Stated otherwise, the control case body 64 is joined to the stack case 24 in a manner that the control case body 64 is provided adjacent to the stack case 24 in a direction perpendicular to the stacking direction of the plurality of power generation cells 34 (on the vehicle rear side). The control case body 64 is fixed to an outer surface of a rear wall 48*r* of the stack case body 48 using a tightening member 68 (see FIG. 4) such as a bolt.

A front wall 62*f* of the control case 62 covers the entire outer surface of the cover member 56 from the vehicle rear side. That is, a wall (front wall 62*f*) as part of the control case 62 is positioned between the cell voltage detection unit 22 and the voltage controller 60. The control case body 64 protrudes above the stack case 24 in a manner that the control case body 64 is overlapped with the contactor unit 32 in the vehicle front/rear direction (see FIG. 4).

In FIGS. 3 and 4, the contactor unit 32 is positioned on an upper part of the stack case body 48 (upper wall 48*u*). The contactor unit 32 and the voltage control unit 30 are positioned adjacent to each other in the vehicle front/rear direction (see FIG. 4). The contactor unit 32 is a switch box. The contactor unit 32 includes a contactor 70 (switch), and a contactor case 72 disposed on an upper surface of the stack case body 48 in the state where the contactor case 72 contains the contactor 70. The contactor 70 performs ON/OFF switching of a power line 74 which connects the fuel cell stack 20 and the voltage controller 60 together. As long as the contactor 70 is capable of ON/OFF switching of the electrical current between the fuel cell stack 20 and a DC/DC converter 156 described later, the contactor 70 may have any shape. The contactor 70 may be a semiconductor switch. Further, the contactor 70 may be an interruption switch (fuse, etc.) for interrupting the power line 74.

Specifically, as shown in FIGS. 3 and 4, the contactor 70 includes a first input terminal 76*a*, a second input terminal 76*b*, a first output terminal 78*a*, and a second output terminal 78*b*.

In FIG. 3, a first power line 74*a* electrically connected to the first terminal plate 38*a* is electrically connected to the first input terminal 76*a*. The first power line 74*a* is inserted into a first through hole 80*a* formed in the upper wall 48*u* of the stack case body 48, and a second through hole 82*a* formed in a lower wall 72*l* of the contactor case 72. The first through hole 80*a* and the second through hole 82*a* face each other, and are connected to each other. That is, the first through hole 80*a* and the second through hole 82*a* are through holes extending through the walls (the upper wall 48*u* and the lower wall 72*l*) which divide the inside of the stack case 24 and the inside of the contactor case 72.

The first power line 74*a* includes a first lead line 84*a*, a first joint 86*a*, and a second lead line 88*a*. Each of the first lead line 84*a* and the second lead line 88*a* is a band shaped metal plate (bus bar). One end of the first lead line 84*a* is coupled to the first terminal plate 38*a*. The other end of the first lead line 84*a* is joined to one end of the second lead line 88*a* by the first joint 86*a*. The other end of the second lead line 88*a* is coupled to the first input terminal 76*a* of the contactor 70.

The first lead line 84*a* includes a first extension part 90*a*, a first bent part 92*a*, and a second extension part 94*a*. The first extension part 90*a* extends upward from one end of the first lead line 84*a*. The first extension part 90*a* extends into a gap S between the first insulating plate 40*a* and the upper wall 48*u* of the stack case body 48, from an upper end of the first terminal plate 38*a* in a manner that the first extension part 90*a* extends through the first insulating plate 40*a*.

The first bent part 92*a* is positioned at an extended end of the first extension part 90*a*. The second extension part 94*a* extends in the stacking direction of the plurality of power generation cells 34, from the first bent part 92*a* toward the other end of the fuel cell stack 20 (toward the second terminal plate 38*b*, in the vehicle left direction), up to the other end of the first lead line 84*a*. The lower surface of the second extension part 94*a* is spaced from the upper surface of the cell stack body 36. Stated otherwise, the second extension part 94*a* (part of the first power line 74*a*) faces the plurality of power generation cells 34 at a distance in a direction perpendicular to the stacking direction of the plurality of power generation cells 34 (the second extension part 94*a* is spaced upward from the plurality of power generation cells 34).

The first joint 86*a* includes a bolt 100*a* inserted into an insertion hole 96*a* formed at the other end of the first lead line 84*a* and an insertion hole 98*a* formed at one end of the second lead line 88*a*, and a nut 102*a* screwed with the bolt 100*a*.

The first joint 86*a* may be an electrically conductive adhesive etc. and stick the other end of the first lead line 84*a* and one end of the second lead line 88*a* together. Further, the first joint 86*a* may be a welding part where the other end of the first lead line 84*a* and one end of the second lead line 88*a* are welded together. The first joint 86*a* may be a swaging part or a brazing part where the other end of the first lead line 84*a* and one end of the second lead line 88*a* are joined together. The first joint 86*a* is positioned inside the first through hole 80*a* and the second through hole 82*a*.

The second lead line 88*a* includes a third extension part 104*a*, a second bent part 106*a*, a fourth extension part 108*a*, a third bent part 110*a*, and a fifth extension part 112*a*. The third extension part 104*a* extends from one end of the second lead line 88*a* toward one end of the fuel cell stack 20 (toward the first terminal plate 38*a*, in the vehicle right direction).

The third extension part 104*a* is disposed in parallel with the second extension part 94*a*. A lower surface of the third extension part 104*a* contacts an upper surface of the second extension part 94*a*. The second bent part 106*a* is positioned at an extended end of the third extension part 104*a*. The second bent part 106*a* is provided at a position shifted from the first bent part 92*a* toward the other end of the fuel cell stack 20 (in the vehicle left direction). The fourth extension part 108*a* extends upward from the second bent part 106*a* to the third bent part 110*a*, into the contactor case 72. The third bent part 110*a* is positioned at an extended end of the fourth extension part 108*a*. The fifth extension part 112*a* extends from the third bent part 110*a* toward one end of the fuel cell stack 20 (vehicle right direction), up to the other end of the second lead line 88*a*.

A second power line 74*b* electrically connected to the second terminal plate 38*b* is electrically connected to the second input terminal 76*b*. The second power line 74*b* is inserted into a third through hole 80*b* formed in the upper wall 48*u* of the stack case body 48, and a fourth through hole 82*b* formed in the lower wall 72*l* of the contactor case 72. The third through hole 80*b* and the fourth through hole 82*b* face each other, and are connected to each other. That is, the third through hole 80*b* and the fourth through hole 82*b* are through holes that extend through the walls (the upper wall 48*u* and the lower wall 72*l*) which divide the inside of the stack case 24 and the inside of the contactor case 72.

The second power line 74*b* includes a third lead line 84*b*, a second joint 86*b*, and a fourth lead line 88*b*. Each of the third lead line 84*b* and the fourth lead line 88*b* is a band shaped metal plate (bus bar). One end of the third lead line 84*b* is coupled to the second terminal plate 38*b*. The other end of the third lead line 84*b* is joined to one end of the fourth lead line 88*b* by the second joint 86*b*. The other end of the fourth lead line 88*b* is coupled to the second input terminal 76*b* of the contactor 70.

The third lead line 84*b* includes a first extension part 90*b*, a first bent part 92*b*, and a second extension part 94*b*. The first extension part 90*b* extends upward from one end of the third lead line 84*b*. The first extension part 90*b* extends from the upper end of the second terminal plate 38*b* into a gap S between the second insulating plate 40*b* and an upper wall 48*u* of the stack case body 48 in a manner that the first extension part 90*b* extends through the second insulating plate 40*b*.

The first bent part 92*b* is positioned at an extended end of the first extension part 90*b*. The second extension part 94*b* extends in the stacking direction of the plurality of power generation cells 34 from the first bend part 92*b* toward one end of the fuel cell stack 20 (toward the first terminal plate 38*a*, in the vehicle right direction), up to the other end of the third lead line 84*b*. The lower surface of the second extension part 94*b* and the upper surface of the cell stack body 36 are spaced from each other. Stated otherwise, the second extension part 94*b* (part of the second power line 74*b*) faces the plurality of power generation cells 34 at a distance in a direction perpendicular to the stacking direction of the plurality of power generation cells 34 (the second extension part 94*b* is spaced upward from the plurality of power generation cells 34).

The second joint 86*b* includes a bolt 100*b* inserted into an insertion hole 96*b* formed at the other end of the third lead line 84*b* and an insertion hole 98*b* formed at one end of the fourth lead line 88*b*, and a nut 102*b* screwed with the bolt 100*b*.

The second joint 86*b* may be an adhesive etc., and stick the other end of the third lead line 84*b* and one end of the fourth lead line 88*b* together. Further, the second joint 86*b* may be a welding part where the other end of the third lead line 84*b* and one end of the fourth lead line 88*b* are welded together. The second joint 86*b* may be a swaging part or a brazing part where the other end of the third lead line 84*b* and one end of the fourth lead line 88*b* are joined together. The second joint 86*b* is positioned inside the third through hole 80*b* and the fourth through hole 82*b*.

The fourth lead line 88*b* includes a third extension part 104*b*, a second bent part 106*b*, a fourth extension part 108*b*, a third bent part 110*b*, and a fifth extension part 112*b*. The third extension part 104*b* extends from one end of the fourth lead line 88*b* toward the other end of the fuel cell stack 20 (toward the second terminal plate 38*b*, in the vehicle left direction).

The third extension part 104*b* is disposed in parallel with the second extension part 94*b*. A lower surface of the third extension part 104*b* contacts an upper surface of the second extension part 94*b*. The second bent part 106*b* is positioned at an extended end of the third extension part 104*b*. The second bent part 106*b* is provided at a position shifted from the first bent part 92*b* toward one end of the fuel cell stack 20 (in the vehicle right direction). The fourth extension part 108*b* extends upward from the second bent part 106*b* toward the third bent part 110*b*, into the contactor case 72. The third bent part 110*b* is positioned at an extended end of the fourth extension part 108*b*. The fifth extension part 112*b* extends from the third bend part 110b toward the other end of the fuel cell stack 20 (in the vehicle left direction), up to the other end of the fourth lead line 88b.

Figure 5:
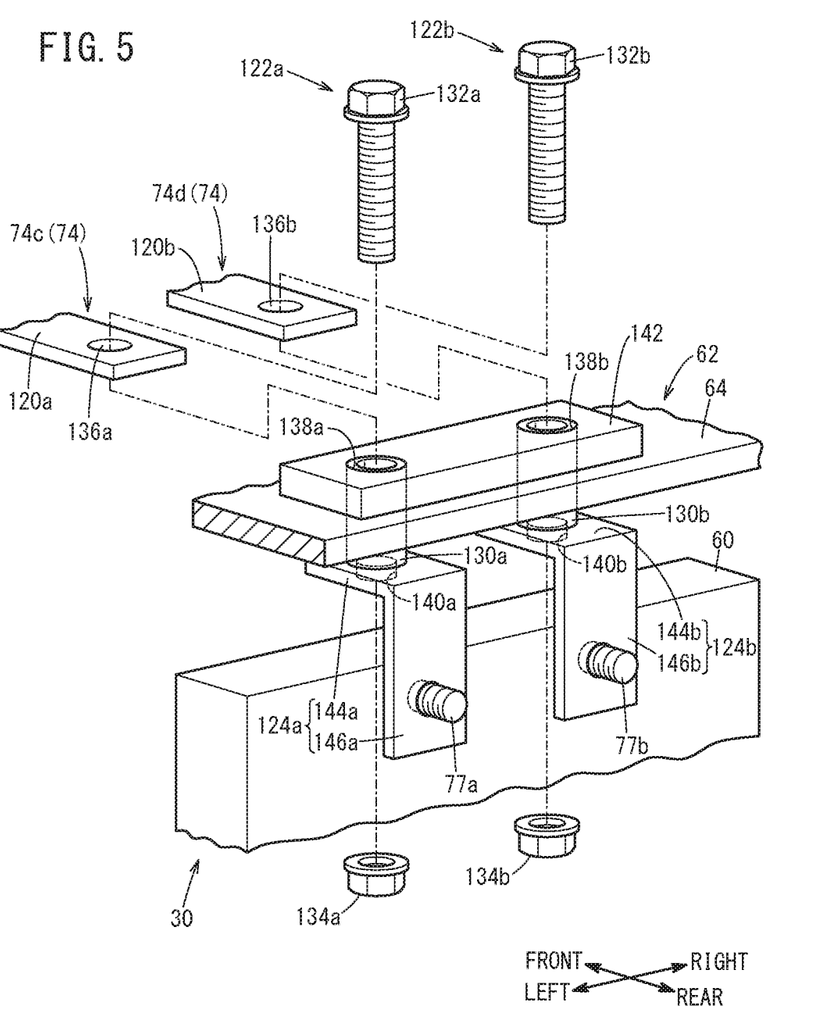
FIG. 5 is a perspective view with partial omission, showing a third power line and a fourth power line in FIG. 4.

As shown in FIG. 4, a third power line 74c electrically connected to a first input terminal 77a of the voltage controller 60 is electrically connected to the first output terminal 78a. In FIGS. 4 and 5, the third power line 74c includes a fifth lead line 120a, a third joint 122a, and a sixth lead line 124a. Each of the fifth lead line 120a and the sixth lead line 124a is a band shaped metal plate (bus bar).

One end of the fifth lead line 120a is coupled to the first output terminal 78a of the contactor 70 (see FIG. 4). The other end of the fifth lead line 120a is joined to one end of the sixth lead line 124a by the third joint 122a. The other end of the sixth lead line 124a is coupled to the first input terminal 77a of the voltage controller 60.

As shown in FIG. 4, the fifth lead line 120a is inserted into a fifth through hole 126a formed in a rear wall 72r of the contactor case 72, and a sixth through hole 128a formed in the front wall 62f of the control case 62. The fifth through hole 126a and the sixth through hole 128a face each other, and are connected to each other. That is, the fifth through hole 126a and the sixth through hole 128a are through holes extending through the walls (the rear wall 72r and the front wall 62f) which divide the inside of the contactor case 72 and the inside of the control case 62.

The fifth lead line 120a extends toward the vehicle rear side from the first output terminal 78a of the contactor 70, into the control case 62. The other end of the fifth lead line 120a and one end of the sixth lead line 124a are disposed in parallel with each other. The other end of the fifth lead line 120a is positioned above one end of the sixth lead line 124a.

In FIGS. 4 and 5, the third joint 122a includes a cylindrical portion 130a extending in the upper/lower direction, a bolt 132a, and a nut 134a. The bolt 132a is inserted into an insertion hole 136a formed at the other end of the fifth lead line 120a, an inner hole 138a of the cylindrical portion 130a, and an insertion hole 140a formed at one end of the sixth lead line 124a. The cylindrical portion 130a is made of electrically conductive material (e.g., metal material such as copper). The nut 134a is screwed with the bolt 132a. An upper end surface of the cylindrical portion 130a contacts a lower surface of the other end of the fifth lead line 120a, and a lower end surface of the cylindrical portion 130a contacts an upper surface of one end of the sixth lead line 124a.

The cylindrical portion 130a is held by a holder member 142 fixed to the control case 62. The holder member 142 is made of insulating material. The holder member 142 extends around the outer circumferential surface of the cylindrical portion 130a.

The third joint 122a may be an adhesive etc. and stick the other end of the fifth lead line 120a and one end of the sixth lead line 124a together. Further, the third joint 122a may be a welding part where the other end of the fifth lead line 120a and one end of the sixth lead line 124a are welded together. The third joint 122a may be a swaging part or a brazing part where the other end of the fifth lead line 120a and one end of the sixth lead line 124a are joined together.

The sixth lead line 124a includes a first portion 144a extending toward the vehicle rear side from one end of the sixth lead line 124a, and a second portion 146a extending downward from an extended end of the first portion 144a. The second portion 146a is positioned on the vehicle rear side of the voltage controller 60.

As shown in FIGS. 4 and 5, a fourth power line 74d electrically connected to a second input terminal 77b of the voltage controller 60 is electrically connected to the second output terminal 78b. In FIGS. 4 and 5, the fourth power line 74d includes a seventh lead line 120b, a fourth joint 122b, and an eighth lead line 124b. Each of the seventh lead line 120b and the eighth lead line 124b is a band shaped metal plate (bus bar).

One end of the seventh lead line 120b is coupled to the second output terminal 78b of the contactor 70 (see FIG. 4). The other end of the seventh lead line 120b is joined to one end of the eighth lead line 124b by the fourth joint 122b. The other end of the eighth lead line 124b is coupled to the second input terminal 77b of the voltage controller 60.

As shown in FIG. 4, the seventh lead line 120b is inserted into a seventh through hole 126b formed in the rear wall 72r of the contactor case 72, and an eighth through hole 128b formed in the front wall 62f of the control case 62. The seventh through hole 126b and the eighth through hole 128b face each other, and are connected each other. That is, the seventh through hole 126b and the eighth through hole 128b are through holes that extend through the walls (rear wall 72r and the front wall 62f) which divide the inside of the contactor case 72 and the inside of the control case 62. It should be noted that the seventh through hole 126b and the above fifth through hole 126a may be connected together. The eighth through hole 128b and the above sixth through hole 128a may be connected together.

The seventh lead line 120b extends toward the vehicle rear side from the second output terminal 78b of the contactor 70 into the control case 62. The other end of the seventh lead line 120b and one end of the eighth lead line 124b are disposed in parallel with each other. The other end of the seventh lead line 120b is positioned above one end of the eighth lead line 124b.

In FIGS. 4 and 5, the fourth joint 122b includes a cylindrical portion 130b extending in the upper/lower direction, a bolt 132b, and a nut 134b. The bolt 132b is inserted into an insertion hole 136b formed at the other end of the seventh lead line 120b, an inner hole 138b of the cylindrical portion 130b, and an insertion hole 140b formed at one end of the eighth lead line 124b. The cylindrical portion 130b is made of electrically conductive material (e.g., metal material such as copper). The nut 134b is screwed with the bolt 132b. An upper end surface of the cylindrical portion 130b contacts a lower surface of the other end of the seventh lead line 120b, and a lower end surface of the cylindrical portion 130b contacts an upper surface of one end of the eighth lead line 124b.

The cylindrical portion 130b is held by the above described holder member 142. The holder member 142 extends around the outer circumferential surface of the cylindrical portion 130b. That is, the cylindrical portion 130a and the cylindrical portion 130b are insulated from each other by the holder member 142.

The fourth joint 122b may be an adhesive etc. and stick the other end of the seventh lead line 120b and one end of the eighth lead line 124b together. Further, the fourth joint 122b may be a wending part where the other end of the seventh lead line 120b and one end of the eighth lead line 124b are welded together. The fourth joint 122b may be a swaging part or a brazing part where the other end of the seventh lead line 120b and one end of the eighth lead line 124b are joined together.

The eighth lead line 124b includes a first portion 144b extending toward the vehicle rear side from one end of the eighth lead line 124b, and a second portion 146b extending downward from an extended end of the first portion 144b. The second portion 146b is positioned on the vehicle rear side of the voltage controller 60.

Figure 6:
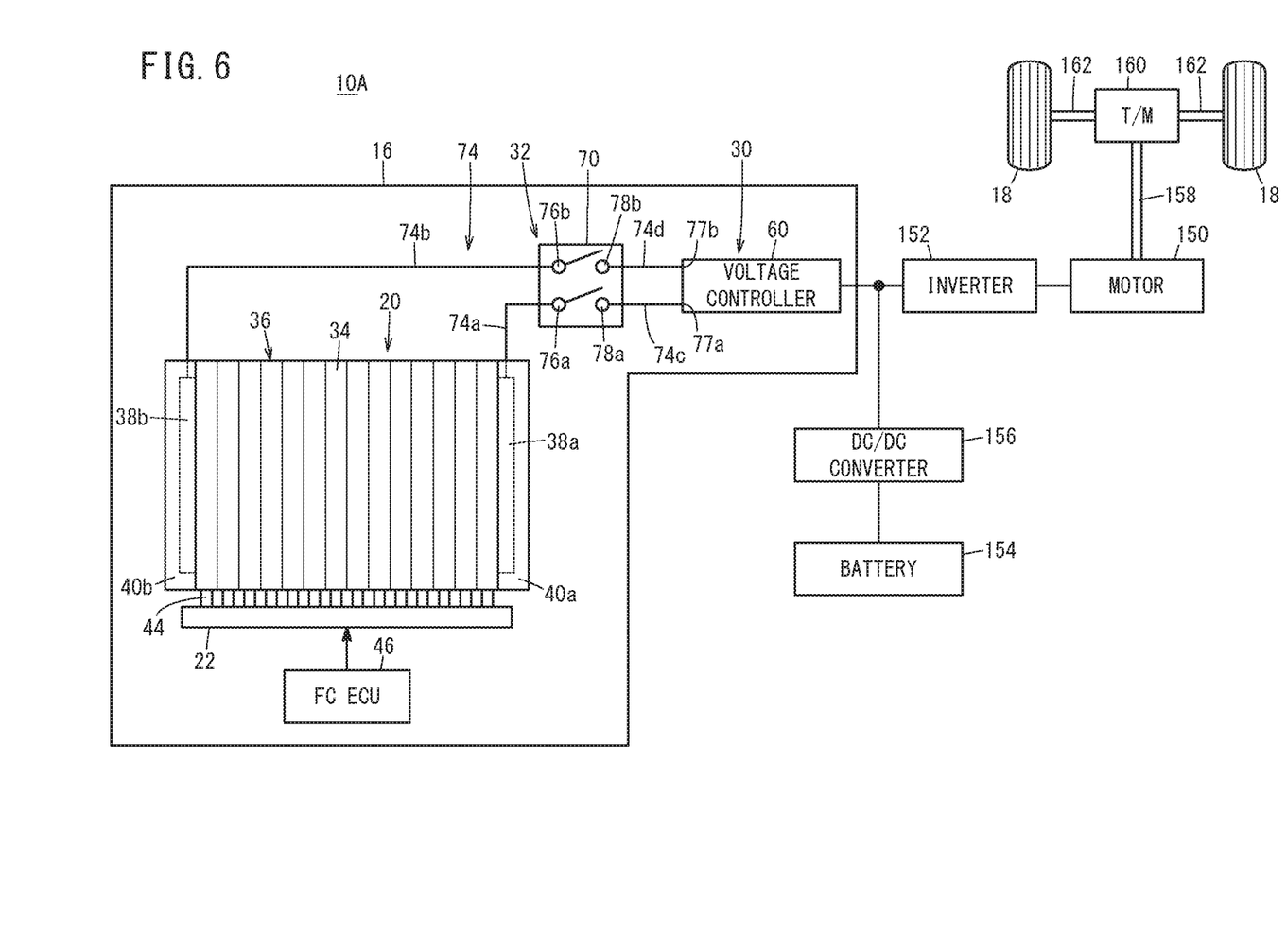
FIG. 6 is a view schematically showing an electrical equipment system of the fuel cell vehicle in FIG. 1.

As described above, in the fuel cell system 16, as shown in FIG. 6, the first terminal plate 38a is electrically connected to the voltage controller 60 (the first input terminal 77a) through the first power line 74a, the contactor 70 (the first input terminal 76a, the first output terminal 78a), and the third power line 74c. The second terminal plate 38b is electrically connected to the voltage controller 60 (second input terminal 77b) through the second power line 74b, the contactor 70 (the second input terminal 76b and the second output terminal 78b), and the fourth power line 74d.

Further, the fuel cell vehicle 10A includes, in addition to the above fuel cell system 16, a traction motor 150, an inverter 152, a battery 154 as an energy storage device, and the DC/DC converter 156. The motor 150 generates a driving force based on electrical energy supplied from the fuel cell system 16 and the battery 154, and rotates the front wheels 18 as drive wheels, through a power transmitter 158, a transmission (T/M) 160, and a vehicle axis 162. Further, the motor 150 regenerates electrical energy, and outputs the regenerated electrical energy to the battery 154.

The inverter 152 performs direct current/alternating current conversion to convert the direct current into the three-phase alternating current and supplies the three-phase alternating current to the motor 150, and supplies the direct current after alternating current/direct current conversion produced during regenerative operation of the motor 150, to the battery 154 through the DC/DC converter 156.

In this case, the fuel cell vehicle 10A according to the embodiment of the present invention offers the following advantages.

In the fuel cell vehicle 10A, the stack case 24 containing the fuel cell stack 20 and the voltage control unit 30 configured to control output voltage of the fuel cell stack 20 are mounted in the front box 14 formed on the vehicle front side of the dashboard 12.

The fuel cell stack 20 includes the plurality of power generation cells 34 stacked in the vehicle width direction, and the voltage control unit 30 includes the voltage controller 60, and the control case 62 containing the voltage controller 60. The control case 62 is joined to the stack case 24 in a manner that the control case 62 is provided adjacent to the stack case 24 in the direction (vehicle rear side) perpendicular to the stacking direction of the plurality of power generation cells 34. The cell voltage detection unit 22 configured to detect the cell voltage of the plurality of power generation cells 34 is disposed between the fuel cell stack 20 and the voltage control unit 30.

In the structure, since the cell voltage detection unit 22 is disposed between the fuel cell stack 20 and the voltage control unit 30, when collision of the fuel cell vehicle 10A occurs, it is possible to protect the cell voltage detection unit 22 by the control case 62 of the voltage control unit 30. Therefore, with the simple structure, when collision of the fuel cell vehicle 10A occurs, it is possible to prevent the damage of the cell voltage detection unit 22.

In the fuel cell vehicle 10A, the control case 62 is positioned on the vehicle rear side of the fuel cell stack 20.

In the structure, when collision of the fuel cell vehicle 10A in the front/rear direction occurs, it is possible to effectively protect the cell voltage detection unit 22 by the control case 62 effectively.

In the fuel cell vehicle 10A, the opening 54 is formed in the wall (rear wall 48r) of the stack case 24 on the side where the control case 62 is present, and the cell voltage detection unit 22 is disposed in the opening 54.

In the structure, it is possible to suppress increase in the size of the fuel cell system 16, and reliably dispose the cell voltage detection unit 22 between the fuel cell stack 20 and the voltage control unit 30.

The stack case 24 is provided with the cover member 56 configured to cover the opening 54.

In the structure, when collision of the fuel cell vehicle 10A occurs, it is possible to effectively protect the cell voltage detection unit 22 by the cover member 56.

The wall (front wall 62f) as part of the control case 62 is positioned between the cell voltage detection unit 22 and the voltage controller 60.

In the structure, when collision of the vehicle occurs, it is possible to effectively prevent the cell voltage detection unit 22 by the front wall 62f of the control case 62.

The fuel cell vehicle 10A includes the power line 74 configured to connect terminal plates of the fuel cell stack 20 (the first terminal plate 38a and the second terminal plate 38b) and the voltage controller 60 together, and the contactor unit 32 including the contactor 70 configured to perform ON/OFF switching of the power line 74. The contactor unit 32 is disposed adjacent to the upper part of the stack case 24.

In the structure, since the fuel cell stack 20, the contactor 70, and the voltage controller 60 can be disposed closely to one another, it is possible to comparatively reduce the length of the power line 74 from the terminal plates (the first terminal plate 38a and the second terminal plate 38b) to the voltage controller 60.

The contactor unit 32 includes the contactor case 72 containing the contactor 70, and the contactor case 72 is disposed in the stack case 24. The portions of the power line 74 (the first power line 74a and the second power line 74b) which electrically connect the terminal plates (the first terminal plate 38a and the second terminal plate 38b) and the contactor 70 together are inserted into the through holes (the first through hole 80a, the second through hole 82a, the third through hole 80b, the fourth through hole 82b) extending through the walls (the upper wall 48u and the lower wall 72l) configured to divide the inside of the contactor case 72 and the inside of the stack case 24.

In the structure, it is possible to install the power line 74 (the first power line 74a and the second power line 74b) efficiently.

The control case 62 protrudes outside of the stack case 24 in a manner that the control case 62 is overlapped with the contactor unit 32 in the vehicle front/rear direction. The portions (the third power line 74c and the fourth power line 74d) of the power line 74 which electrically connects the contactor 70 and the voltage controller 60 together are inserted into the through holes (the fifth through hole 126a, the sixth through hole 128a, the seventh through hole 126b, and the eighth through hole 128b) formed in the walls (the rear wall 72r and the front wall 62f) configured to divide the inside of the contactor case 72 and the inside of the control case 62.

In the structure, it is possible to install the power lines 74 (the third power line 74c and the fourth power line 74d) efficiently.

In the embodiment of the present invention, the contactor unit 32 may be disposed below the stack case 24 (below the lower wall 48l).

Second Embodiment

Next, a fuel cell vehicle 10B according to a second embodiment of the present invention will be described below. In the fuel cell vehicle 10B according to the embodiment of the present invention, the constituent elements having structure identical to those of the fuel cell vehicle 10A according to the above described first embodiment are labeled with the same reference numerals, and the detailed description is omitted. Also in a third embodiment described later, the constituent elements having structure identical to those of the fuel cell vehicle 10A according to the above described first embodiment are labeled with the same reference numerals, and the detailed description is omitted.

Figure 7:
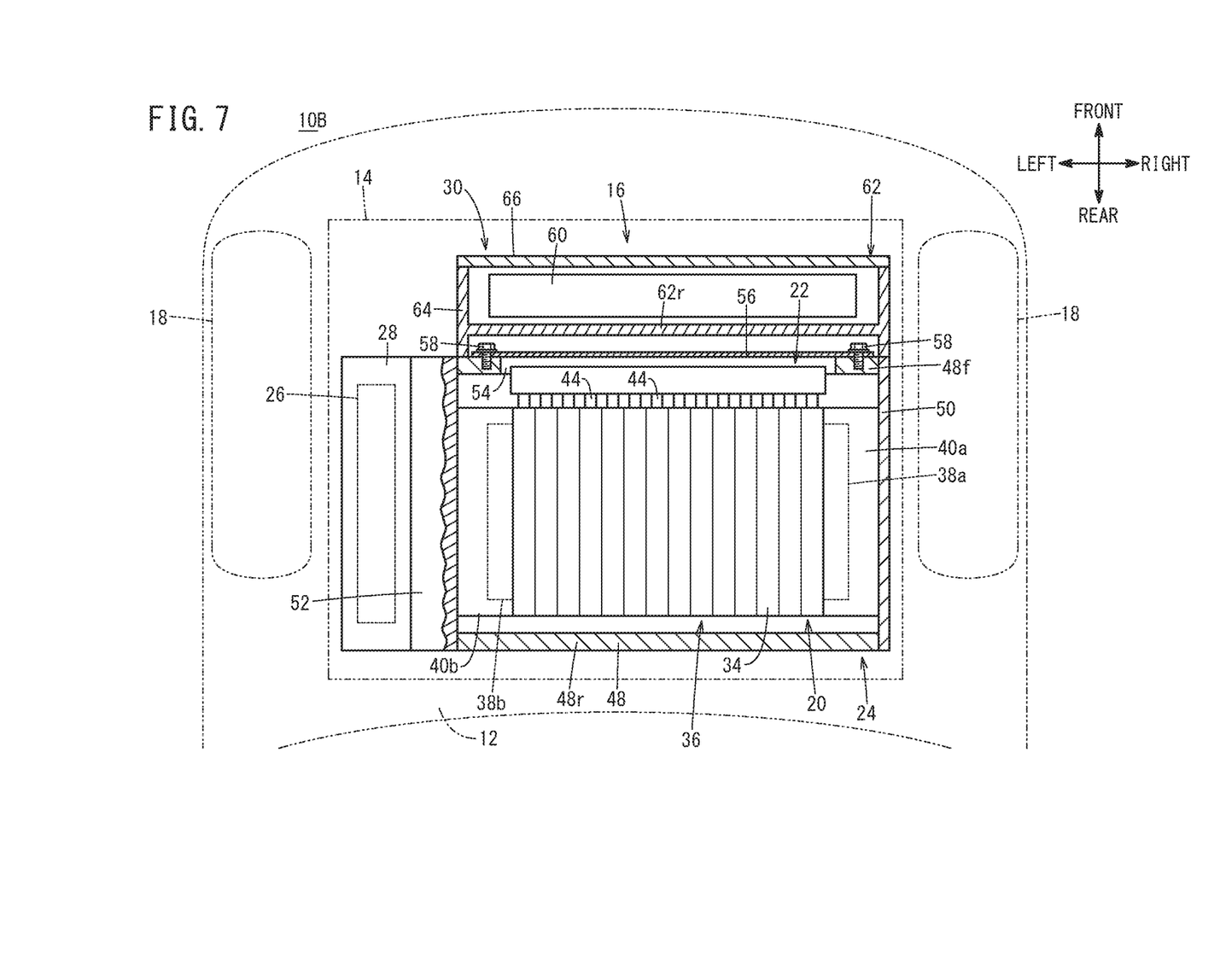
FIG. 7 is a lateral cross sectional view with partial omission, showing a fuel cell vehicle according to a second embodiment of the present invention.

As shown in FIG. 7, in the fuel cell vehicle 10B, the voltage control unit 30 is disposed on the vehicle front side of the stack case 24. Further, the cell voltage detection unit 22 is disposed between the fuel cell stack 20 and the voltage control unit 30. An opening 54 is formed in the front wall 48*f* of the stack case body 48, for disposing the cell voltage detection unit 22 in the opening 54.

A rear wall 62*r* of the control case 62 covers the entire outer surface of the cover member 56. That is, a wall (rear wall 62*r*) as part of the control case 62 is positioned between the cell voltage detection unit 22 and the voltage controller 60.

The fuel cell vehicle 10B according to the second embodiment offers the same advantages as in the case of the fuel cell vehicle 10A according to the above described first embodiment. In the fuel cell vehicle 10B, the contactor unit 32 may be disposed on or below (the lower wall 48*l*), or on or above (the upper wall 48*u*) the stack case body 48.

Third Embodiment

Figure 8:
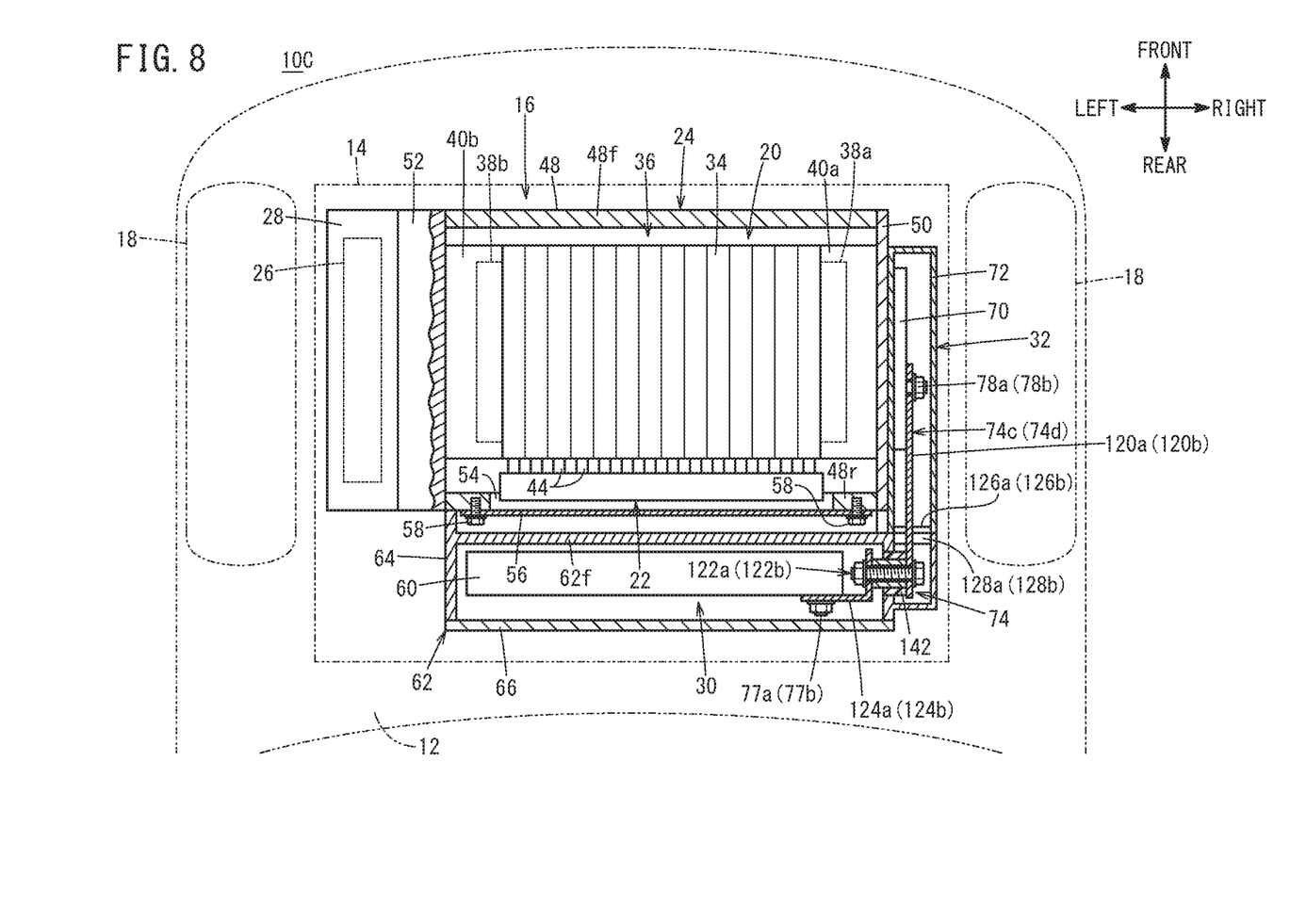
FIG. 8 is a lateral cross sectional view with partial omission, showing a fuel cell vehicle according to a third embodiment of the present invention.

Next, a fuel cell vehicle 10C according to a third embodiment of the present invention will be described below. As shown in FIG. 8, in the fuel cell vehicle 10C, the contactor unit 32 is disposed on a side of the stack case 24 in the vehicle right direction (on the right side cover 50). In this case, the control case 62 protrudes in the vehicle right direction from the stack case 24 in a manner that the control case 62 is overlapped with the contactor unit 32 in the vehicle font/rear direction.

The fuel cell vehicle 10C according to the third embodiment offers the same advantages as in the case of the fuel cell vehicle 10A according to the above described first embodiment. In the fuel cell vehicle 10C, the voltage control unit 30 may be disposed on the vehicle front side (on the front wall 48*f*) of the stack case body 48 as in the case of the fuel cell vehicle 10B according to the second embodiment.

Further, in the fuel cell vehicle 10C, the contactor unit 32 may be disposed on a side of the stack case 24 in the vehicle left direction (on the left side cover 52), and the auxiliary device case 28 may be disposed on a side in the vehicle right direction (on the right side cover 50). In this case, the voltage control unit 30 protrudes from the stack case 24 in the vehicle left direction in a manner that the voltage control unit 30 is overlapped with the contactor unit 32 in the vehicle front/rear direction.

In the present invention, it is adequate that the control case 62 is joined to the stack case 24 in a manner that the control case 62 is provided adjacent to the stack case 24 in a direction perpendicular to the stacking direction of the plurality of power generation cells 34. That is, the control case 62 may be joined to the stack case 24 in a manner that the control case 62 is positioned adjacent to the stack case 24 in the upper/lower direction. In this case, the cell voltage detection unit 22 is positioned on or above, or on or below the fuel cell stack 20 in a manner that the cell voltage detection unit 22 is positioned between the fuel cell stack 20 and the voltage control unit 30.

The fuel cell vehicle according to the present invention is not limited to the above described embodiments. It is a matter of course that various structures can be adopted without departing from the gist of the present invention.

What is claimed is:

1. A fuel cell vehicle comprising a stack case containing a fuel cell stack and a voltage control unit configured to control output voltage of the fuel cell stack, the stack case and the voltage control unit being mounted in a front box formed on a vehicle front side of a dashboard,
    wherein the fuel cell stack includes a plurality of power generation cells stacked in a vehicle width direction, and
    the voltage control unit comprises:
    a voltage controller; and
    a control case containing the voltage controller, and
    wherein the control case is joined to the stack case in a manner that the control case is provided adjacent to the stack case in a direction perpendicular to a stacking direction of the plurality of power generation cells; and
    a cell voltage detection unit configured to detect cell voltage of the plurality of power generation cells is disposed between the fuel cell stack and the voltage control unit,
    wherein an opening is formed in a wall of the stack case, on a side where the control case is present, and
    wherein the cell voltage detection unit is disposed in the opening.

2. The fuel cell stack according to claim 1, wherein the control case is positioned on the vehicle front side or a vehicle rear side of the fuel cell stack.

3. The fuel cell vehicle according to claim 1, wherein the stack case is provided with a cover member configured to cover the opening.

4. The fuel cell vehicle according to claim 3, wherein the control case is configured to cover an entire outer surface of the cover member.

5. The fuel cell vehicle according to claim 3, wherein a wall as part of the control case is positioned between the cell voltage detection unit and the voltage controller.

6. The fuel cell vehicle according to claim 1, comprising:
    a power line configured to connect a terminal plate of the fuel cell stack and the power controller together; and
    a contactor unit including a contactor configured to perform ON/OFF switching of the power line,
    wherein the contactor unit is provided adjacent to the stack case in an upper/lower direction or in the vehicle width direction.

7. The fuel cell vehicle according to claim 6, wherein a portion of the power line which electrically connects the terminal plate and the contactor together partially faces the plurality of power generation cells at a distance in a direction perpendicular to the stacking direction of the plurality of power generation cells.

8. The fuel cell vehicle according to claim 6, wherein the contactor unit is disposed adjacent to an upper part of the stack case.

9. The fuel cell vehicle according to claim 6, wherein the contactor unit comprises a contactor case containing the contactor, and disposed in the stack case; a portion of the power line which electrically connects the terminal plate and the contactor together is inserted into a through hole extending through a wall configured to divide an inside of the contactor case and an inside of the stack case.

10. The fuel cell vehicle according to claim 9, wherein the control case protrudes outside of the stack case in a manner that the control case is overlapped with the contactor unit in a vehicle front/rear direction; and a portion of the power line which electrically connects the contactor and the voltage controller together is inserted into a through hole formed in a wall configured to divide the inside of the contactor case and the inside of a control case.

\* \* \* \* \*